United States Patent
Kister et al.

(10) Patent No.: US 7,056,071 B2
(45) Date of Patent: Jun. 6, 2006

(54) BUSHING REPAIR APPARATUS FOR USE IN REPAIRING A MACHINE GUN FEEDER HOUSING

(75) Inventors: Wendell Kister, Fillmore, CA (US); Gregory V. Brodbeck, Camarillo, CA (US); Ronald L. Spencer, Camarillo, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 129 days.

(21) Appl. No.: 10/956,519

(22) Filed: Sep. 28, 2004

(65) Prior Publication Data

US 2006/0067799 A1   Mar. 30, 2006

(51) Int. Cl.
  B23B 49/02   (2006.01)
  B23B 47/28   (2006.01)

(52) U.S. Cl. ..................... 408/115 R; 408/97
(58) Field of Classification Search .................. 408/97, 408/115 R, 72 B, 115 B, 241 B
See application file for complete search history.

(56) References Cited

U.S. PATENT DOCUMENTS

| | | | | |
|---|---|---|---|---|
| 3,062,076 A | * | 11/1962 | Craig | 408/105 |
| 3,302,674 A | * | 2/1967 | Russell et al. | 408/241 G |
| 3,807,889 A | * | 4/1974 | Kiezel | 408/108 |
| 4,443,138 A | * | 4/1984 | Butera | 408/115 R |
| 4,759,666 A | * | 7/1988 | Grab | 408/115 B |
| 4,884,926 A | * | 12/1989 | Gibson | 408/115 R |
| 4,952,101 A | * | 8/1990 | Coombs | 408/115 R |
| 5,024,564 A | * | 6/1991 | Lloyd | 408/115 R |
| 5,222,845 A | * | 6/1993 | Goldstein et al. | 408/103 |
| 5,466,098 A | * | 11/1995 | Juang | 408/115 R |
| 5,782,006 A | * | 7/1998 | Erway et al. | 33/520 |
| 6,079,914 A | * | 6/2000 | Peters | 408/92 |
| 6,193,449 B1 | * | 2/2001 | Diaz | 408/115 R |
| 6,244,794 B1 | * | 6/2001 | Lindsay | 408/103 |
| 6,398,465 B1 | * | 6/2002 | Monge | 408/1 R |
| 6,659,695 B1 | * | 12/2003 | Park | 408/103 |
| 6,954,989 B1 | * | 10/2005 | Morton | 33/194 |

FOREIGN PATENT DOCUMENTS

GB        1401716 A    *   7/1975

* cited by examiner

Primary Examiner—Boyer D. Ashley
Assistant Examiner—Michael W. Talbot
(74) Attorney, Agent, or Firm—David S. Kalmbaugh

(57) ABSTRACT

An apparatus for repairing a pair of non-conforming bushings on the M89E1 Declutching Ammo feeder for the M197 machine gun. The apparatus includes a central body and a pair of large drill plates which allows a user to drill out the non-conforming bushings from the ammo feeder. The user then press fits replacement bushings into the ammo feeder. The apparatus also includes a pair of small drill plates which allows the user to drills pin mounting holes into the replacement bushings.

20 Claims, 7 Drawing Sheets

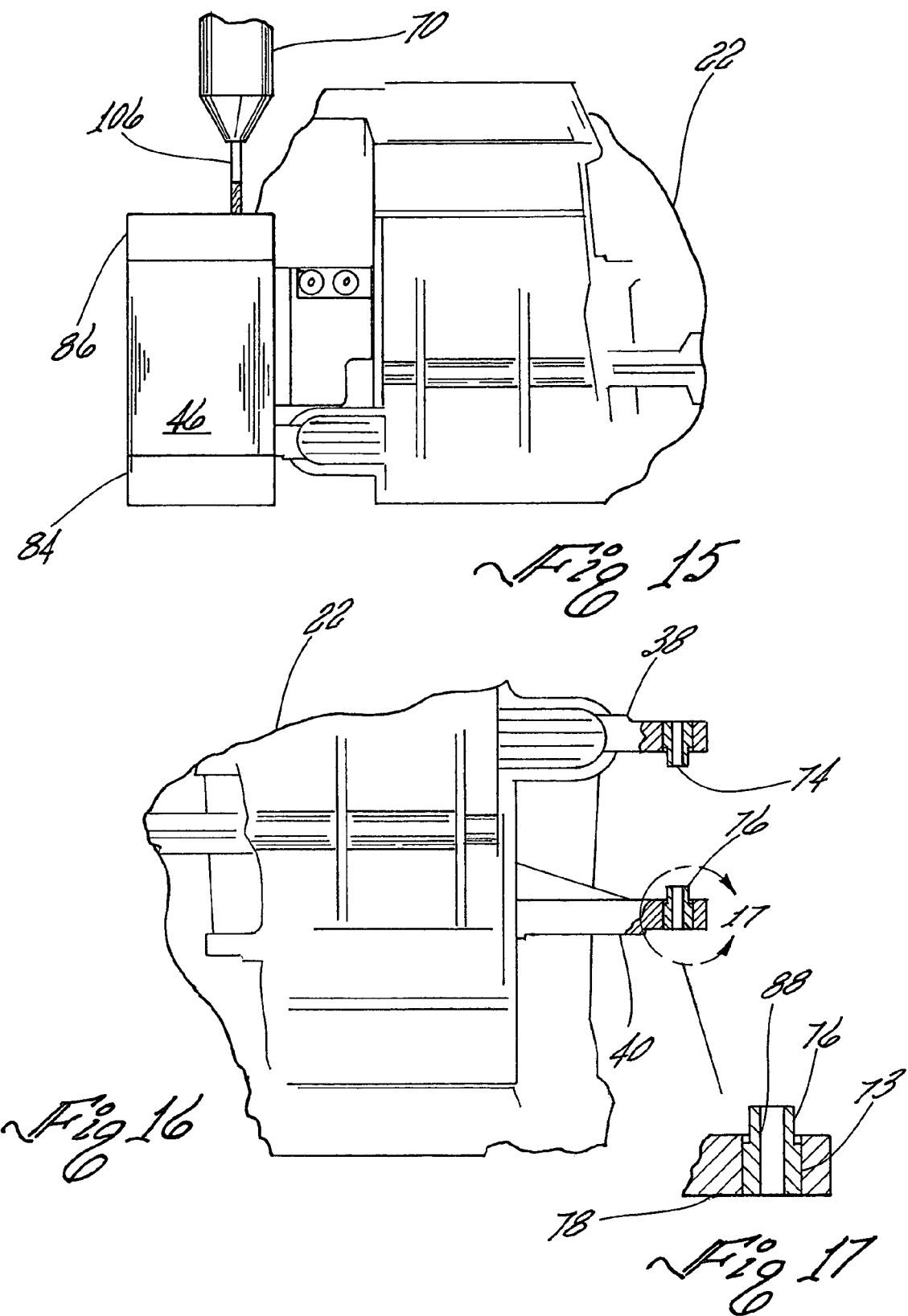

BUSHING REPAIR APPARATUS FOR USE IN REPAIRING A MACHINE GUN FEEDER HOUSING

BACKGROUND OF THE INVENTION

1. Field of the Invention

The present invention relates generally to repairing a machine gun. More specifically, the present invention relates to an apparatus which is used to repair a pair of bushings on the M89E1 Declutching Ammo feeder for the M197 machine gun.

2. Description of the Prior Art

The M197 machine gun, which is used on the Cobra Helicopter utilizes the M89E1 Declutching Ammo feeder to provide ammunition to the machine gun. The feeder is fixed to the machine gun housing with two mounting pins which have a diameter of 0.2400 inches. The forward housing of the feeder has two bushings which receive one of the two mounting pins.

The firing of the machine gun over time erodes the very precise hole diameter in each bushing which necessitates the bushings be replaced periodically. Replacement of the bushings is required when the hole diameter in the bushing exceeds 0.245 inches. In addition, the bushings are permanently cast into the feeder housing.

To date, a repair procedure has not been developed to replace the bushings on the feeder for the machine gun. Since there is no repair procedure several hundred feeders have been taken out of service resulting in significant cost to the military. The replacement cost to the military for the forward housing of the M89E1 Declutching Ammo feeder is approximately $5000.00.

SUMMARY OF THE INVENTION

The present invention overcomes the difficulties of the past including those mentioned above in that it comprises a relatively simple apparatus utilized in a repair procedure to replace defective bushings on the Ammo feeder for the M197 machine gun.

The bushing repair apparatus includes a central body which is attached by the user to the forward housing of the ammo feeder and a pair of large drill plates which the user attaches to the central body of bushing repair apparatus. The large drill plates each have a 0.4688 inch drill bushing hole. The 0.4688 inch drill bushing hole in each drill plate allows the user using a drill and drill bit to drill out the non-conforming bushing leaving a 0.4688 inch diameter hole for a replacement bushing. The user next press fits replacement bushings into these holes.

The bushing repair apparatus also includes a pair of locating plates which allows the user to set a 9 inch nominal distance between mounting pin holes in the arms 96 and 98 on one end of the forward housing and mounting pin holes to be drilled through the replacement bushings.

A pair of small drill plates are also attached to the central body with each small drill plate having a 6.1 mm hole. Once the small drill plates are positioned using the locating plates, the user removes the locating plates. The user than drills a 6.1 mm mounting pin hole in each replacement bushing using a 6.1 mm drill bit.

BRIEF DESCRIPTION OF THE DRAWINGS

FIGS. 14–17 depict the mounting pin holes being drilled out of the replacement bushings on the ammo feeder for the M197 machine gun.

DETAILED DESCRIPTION OF THE PREFERRED EMBODIMENT

Figure 1:
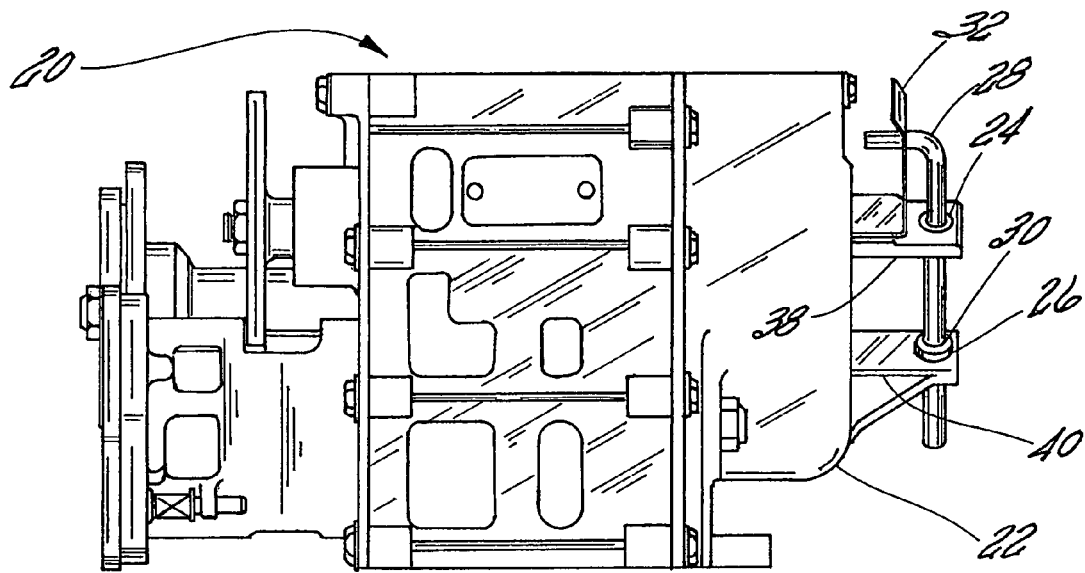
FIG. 1 is a view illustrating the ammo feeder for the M197 machine gun including the bushings to be replaced using the alignment fixture of the present invention.
Figure 2:
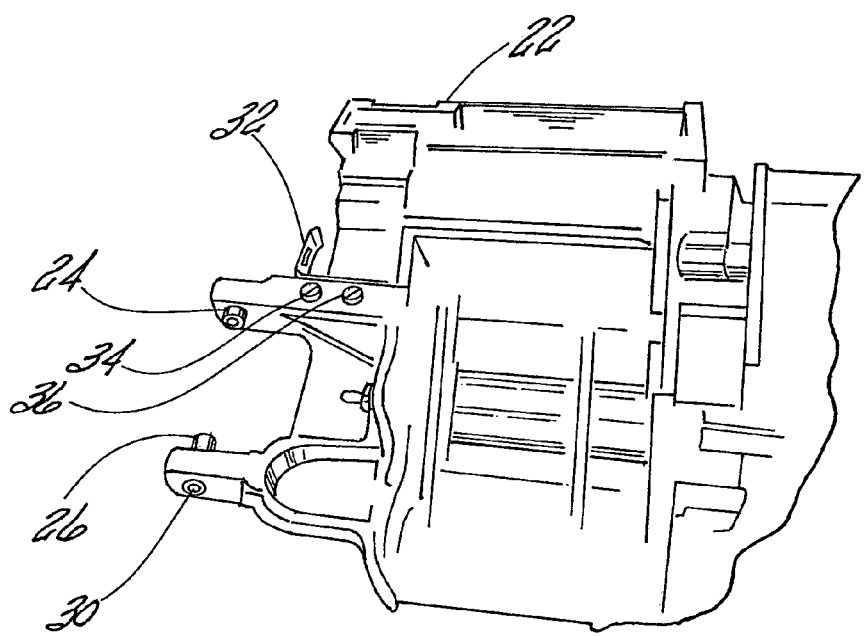
FIG. 2 is another view illustrating the ammo feeder of FIG. 1.

Referring first to FIGS. 1 and 2, there is shown the M89E1 Declutching Ammo feeder assembly 20 for which when coupled to the M197 machine gun feeds ammunition to the machine gun. The M197 machine gun is used on board the Copra Helicopter. The feeder assembly 20 is coupled to the machine gun housing with two mounting pins which have a diameter of 0.2400 inches. The forward housing 22 of the feeder assembly 20 has two bushings 24 and 26 which receive one mounting pin 28 of the two mounting pins. Each of the bushings 24 and 26 has a mounting pin aperture/hole 30 for securing the mounting pin 28 to the forward housing 22 of the feeder assembly 20. A lock 32 which is affixed to the forward housing 22 by a pair of slotted screws 34 and 36 which lock mounting pin 28 in a fixed position relative to feeder assembly 20.

The firing of the machine gun over time erodes the very precise hole diameter of apertures 30 in each bushing 24 and 26 which necessitates the bushings be replaced periodically. Replacement of the bushings is required when the hole diameter of the apertures 30 in the bushings 24 and 26 exceeds 0.245 inches.

The bushings 24 and 26 are permanently cast into a pair of arms 38 and 40 which extend from the forward housing 22 as is best shown in FIG. 1.

Figure 3:
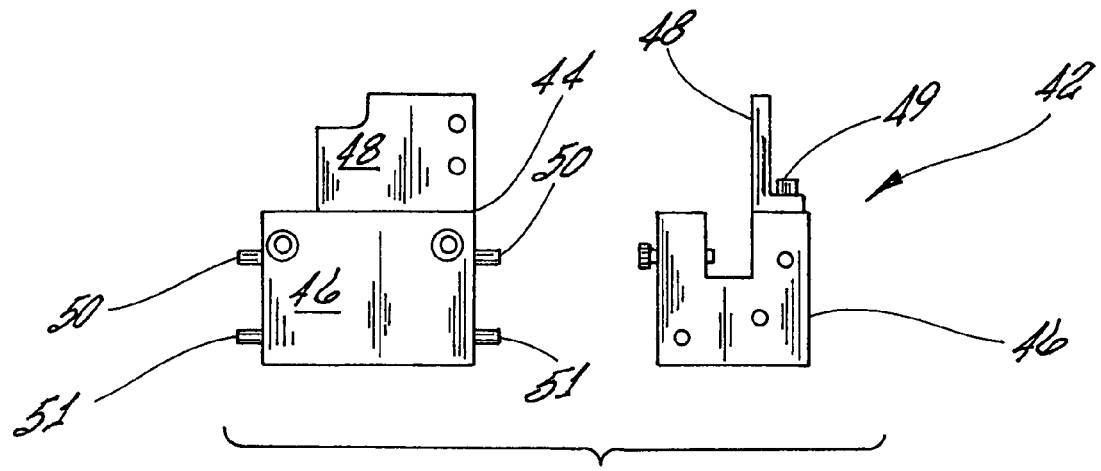
FIG. 3 illustrates the central assembly for the bushing repair apparatus of the present invention.
Figure 4:
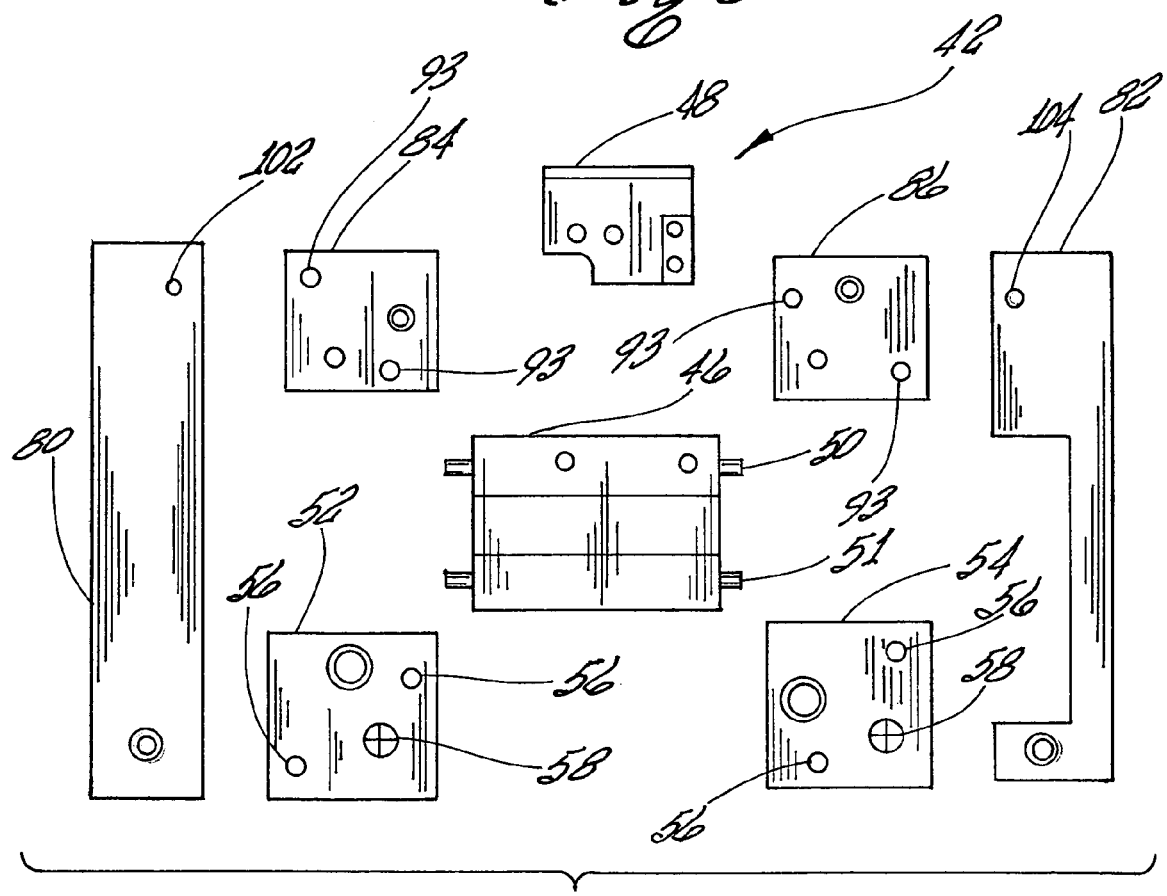
FIG. 4 illustrates each of the components of the bushing repair apparatus of FIG. 3.

Referring to FIGS. 1, 3, 4 and 5 to replace the bushings 24 and 26, a user drills out the out of tolerance bushings 24 and 26 within the arms 38 and 40 of forward housing 22 using the bushing repair fixture 42 illustrated in FIG. 3 and FIG. 4 to align a drill bit with the bushings 24 and 26. As shown in FIG. 3, the bushing repair fixture/apparatus 42 includes a central assembly 44 comprising a central body 46 and a mating plate 48 affixed to the central body 46 by a pair of cap screws 49. Attached to opposite sides of the central body 46 are a pair of stainless steel alignment pins 50 and 51.

Referring to FIG. 4, the alignment pins 50 and 51 allow a user to align each of the two rectangular shaped large drill plates 52 and 54 to the central body 46. Each drill plate 52 and 54 has pair of alignment holes 56 which are adapted to receive the alignment pins 50 and 51 located on each side of the central body 46 of bushing repair fixture 42. Each drill plate 52 and 54 also has a cap screw 58 which is used to secure the drill plates 52 and 54 to the central body 46 of bushing repair fixture 42.

Figure 5:
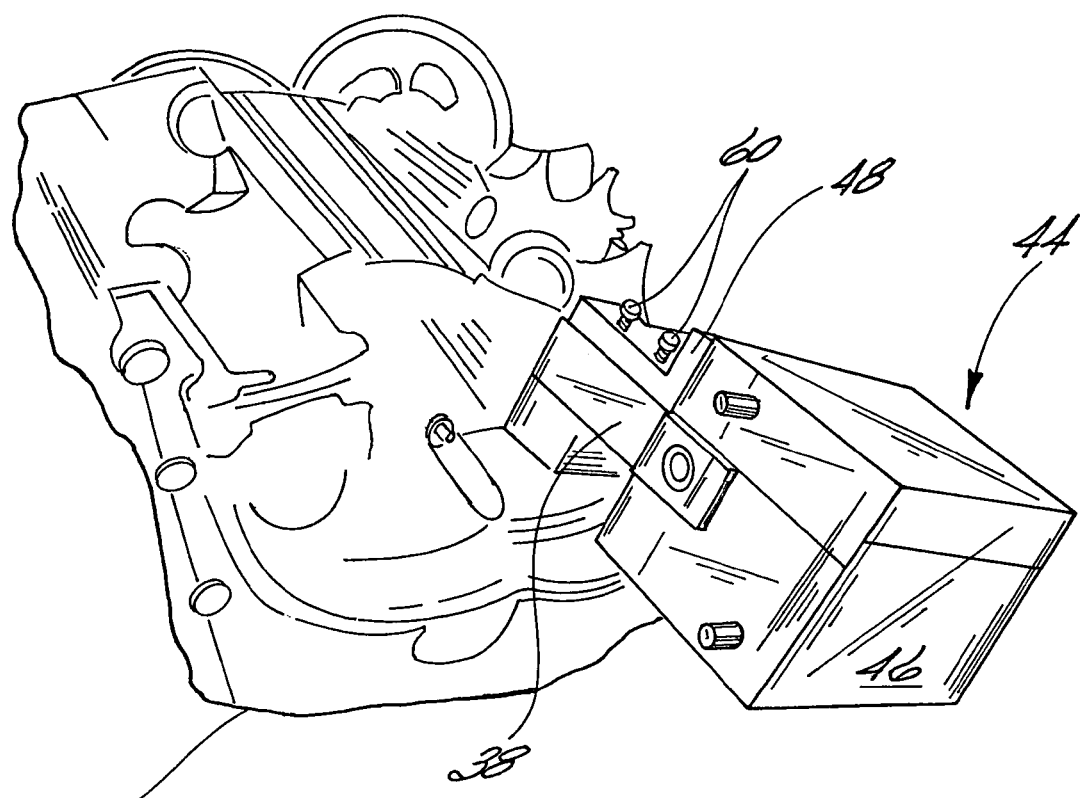
FIG. 5 is a view illustrating the central assembly for the bushing repair apparatus affixed to the ammo feeder for the M197 machine gun.

Referring to FIGS. 1, 3 and 5, prior to removing the 24 and 26 from the forward housing 22 of the feeder assembly 20, the user should consult the maintenance manual for the feeder assembly 20 to determine if the two mounting pin holes 30 in bushings 24 and 26 exceed specified limits. The bushings 24 and 26 are to be replaced only if the mounting pin aperture/hole 30 in each bushing 24 and 26 exceeds the maximum hole diameter of 0.245 inches. When the specified limit is exceeded, the user removes the lock 32 from the forward housing 22 by unscrewing and then removing the pair of slotted screws 34 and 36 shown in FIG. 2.

To remove the bushings 24 and 26 after the bushings 24 and 26 are determined to be non-conforming, the user positions the central assembly 44 of the bushing repair fixture 42 onto the arms 38 and 40 of forward housing 22 as shown in FIG. 5. A pair of cap screws 60 are inserted through mating plate 48 into the threaded holes for lock 32 within arm 38 of forward housing 22. The user then hand tightens caps screws 60 securing the central assembly 44 of the bushing repair fixture 42 to the forward housing 22.

Figure 7:
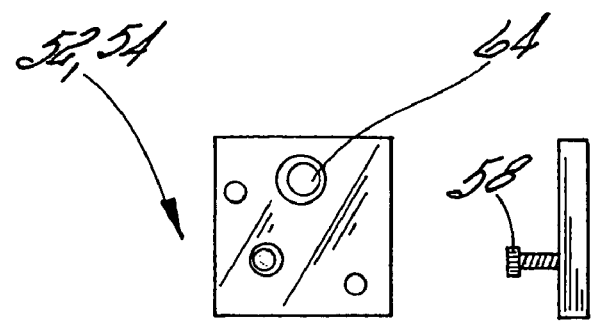
FIG. 7 illustrates the large drill plates for the bushing repair apparatus of FIG. 4.

Referring to FIGS. 3, and 7, the user next attaches the drill plates 52 and 54 to opposite sides of the central body 46 of bush repair fixture 42 using cap screws 58 to secure the drill plates 52 and 54 to the central body 46. The stainless steel alignment pins 50 and 51 align a 0.4688 inch drill bushing hole 64 within each drill plate 52 and 54 with the out of tolerance bushings 24 and 26. The 0.4688 inch drill bushing hole 64 in each drill plate 52 and 54 is used for removal of the out of tolerance bushings 24 and 26 within the forward housing 22 by drilling out the bushings 24 and 26.

Figure 8:
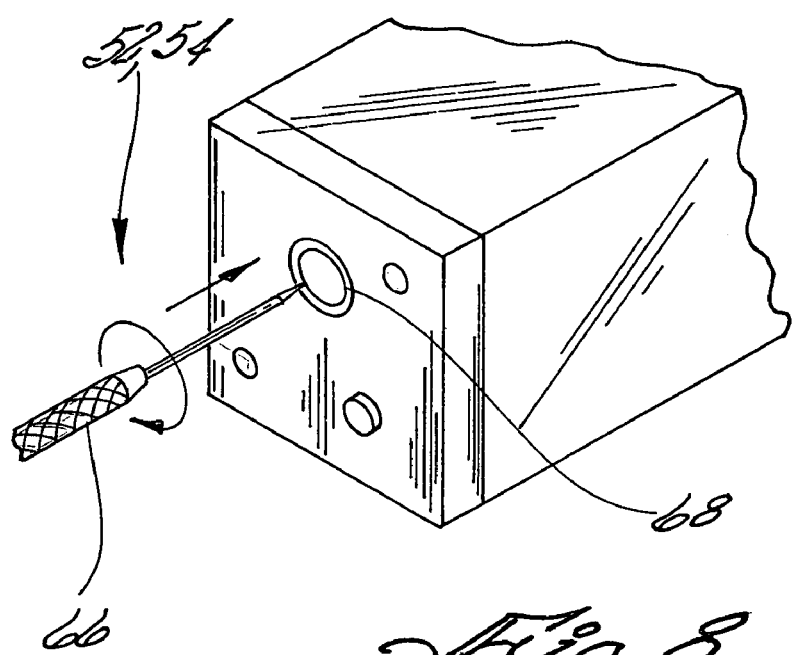
FIG. 8 illustrates the use of a scribe tool to mark a circle for drilling out an out of tolerance bushing on the ammo feeder for the M197 machine gun.
Figure 9:
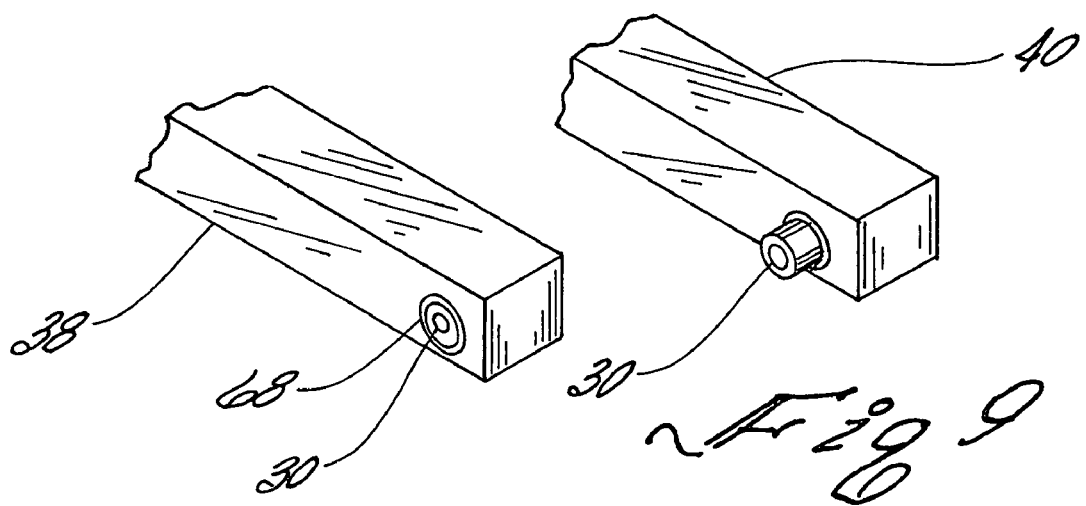
FIG. 9 illustrates the scribed circle after removal of the bushing repair apparatus from the ammo feeder.

Referring to FIGS. 7, 8 and 9, the user using the scribe tool 66 illustrated in FIG. 8 scribes a circle 68 on an outer surface of each arm 38 and 40 of forward housing 22. This circle 68 is scribed around the circumference of the 0.4688 inch drill bushing hole 64 in each drill plate 52 and 54. Circle 68 indicates where the drilled hole is to be located to remove out of tolerance bushings 24 and 26. The user's scribing of circle 68 is required since positioning of the bushings 24 and 26 can vary when the forward housing 22 is first cast at the foundry. The user's scribing of circle 68 also assist in drilling out bushing 24 and 26 with much as accuracy as possible.

The user next removes the drill plates 52 and 54 and central assembly 44 to examine the scribed circle 68 as shown in FIG. 9. If the scribed circle 68 aligns with the mounting pin apertures 30, the user re-installs the bushing repair fixture 42 including drill plates 52 and 54. If the circles 30 and 68 do not coincide, the user applies shims to the drill plates 52 and 54 to position the 0.4688 inch drill bushing hole 64 within each drill plate 52 and 54 coaxially with the mounting pin apertures 30.

Figure 10:
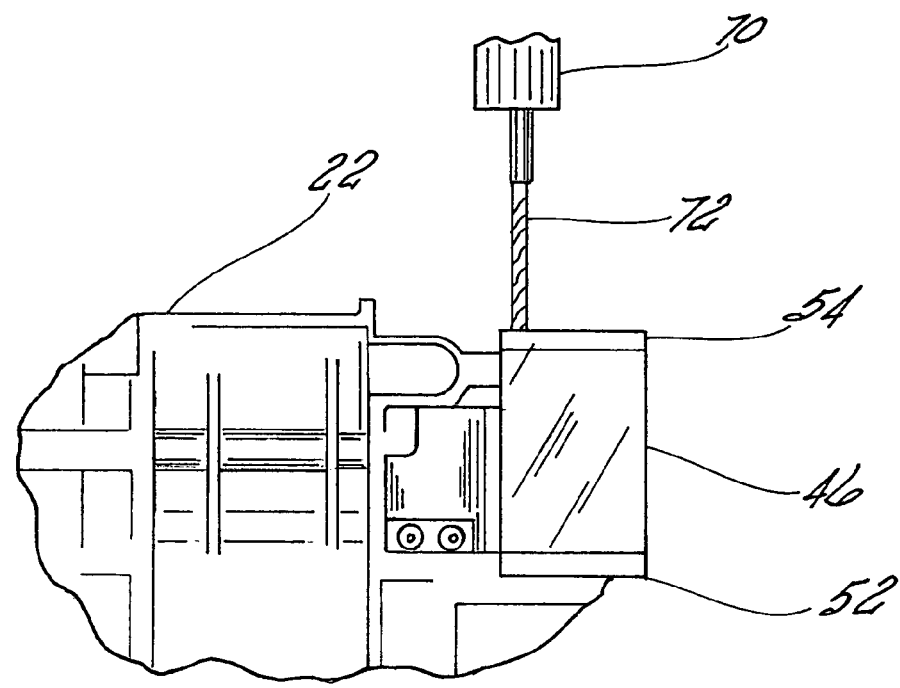
FIGS. 10 and 11 illustrate the out of tolerance bushings being drilled out of the forward housing of the ammo feeder.
Figure 11:
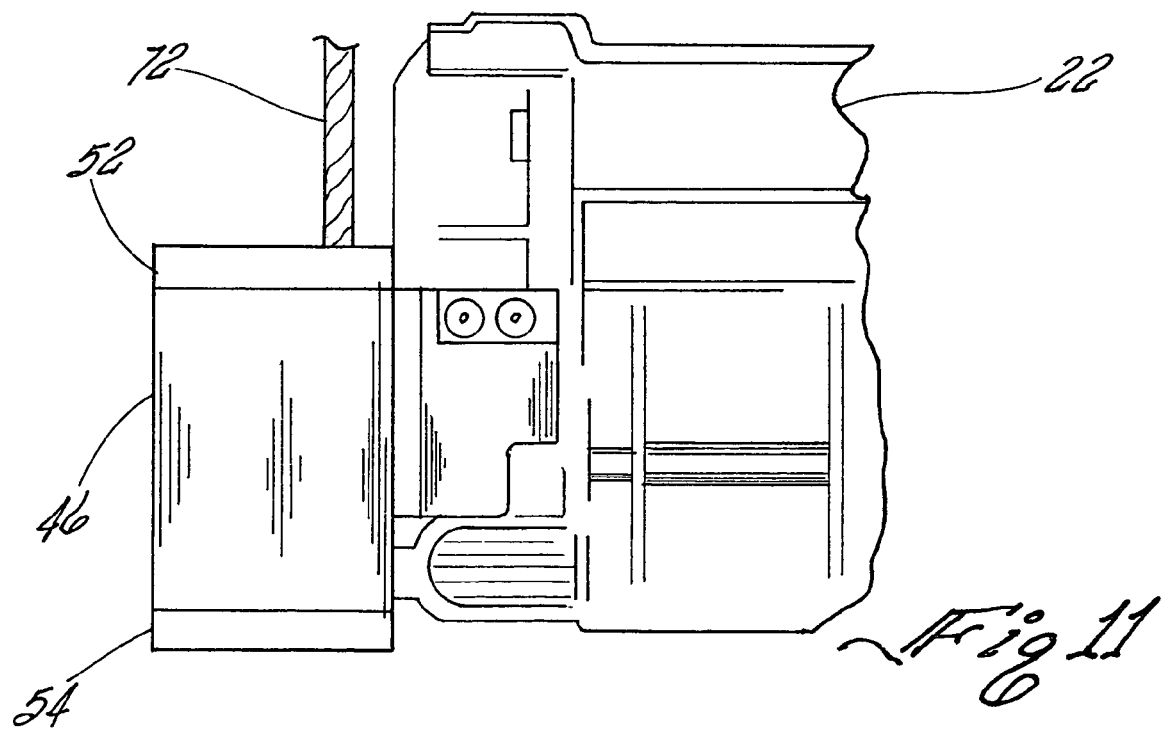
Figure 12:
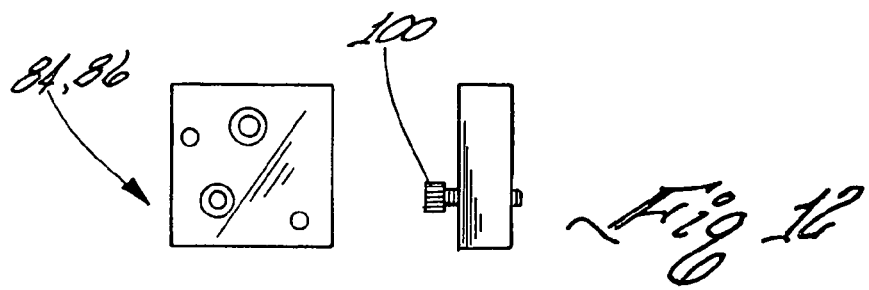
FIG. 12 illustrates the small drill plates for the bushing repair apparatus of FIG. 4.

After the user positions the drill plates 52 and 54 in coaxial alignment with the mounting pin holes 30 and scribed circles 68, the user utilizing a drill 70 and a 0.4688 inch drill bit 72 drills out the out of tolerance bushings 24 and 26 within the arms 38 and 40 of forward housing 22 in the manner illustrated in FIG. 10 and FIG. 11. This leaves a 0.4688 inch hole 73 (FIG. 17) in each arm 38 and 40 of the forward housing 22.

Referring now to FIGS. 16 and 17, the user first removes the bushing repair fixture 42. The user using a file then cleans away any remaining residue from the arms 38 and 40 which extend from the forward housing 22. The 0.4688 hole 73 left from removing the out of tolerance bushing 38 and 40 are left alone allowing the user to force a fit a replacement bushing into each arm 38 and 40 of the forward housing 22.

Two blank replacement bushings 74 and 76 are pressed into the arms 38 and 40 feeder using an arbor press, which is a hydraulic press. The replacement bushings are positioned flush to the outer surface 78 of arms 38 and 40 of forward housing 22.

Referring again to FIGS. 4 and 6, the bushing repair fixture 42 include a pair of locating plates 80 and 82 and a pair of rectangular shaped small drill plates 84 and 86. Each locating plate 80 and 82 has a bushing 87 or 89 attached to its forward end on an inner surface of the locating plate.

Figure 6:
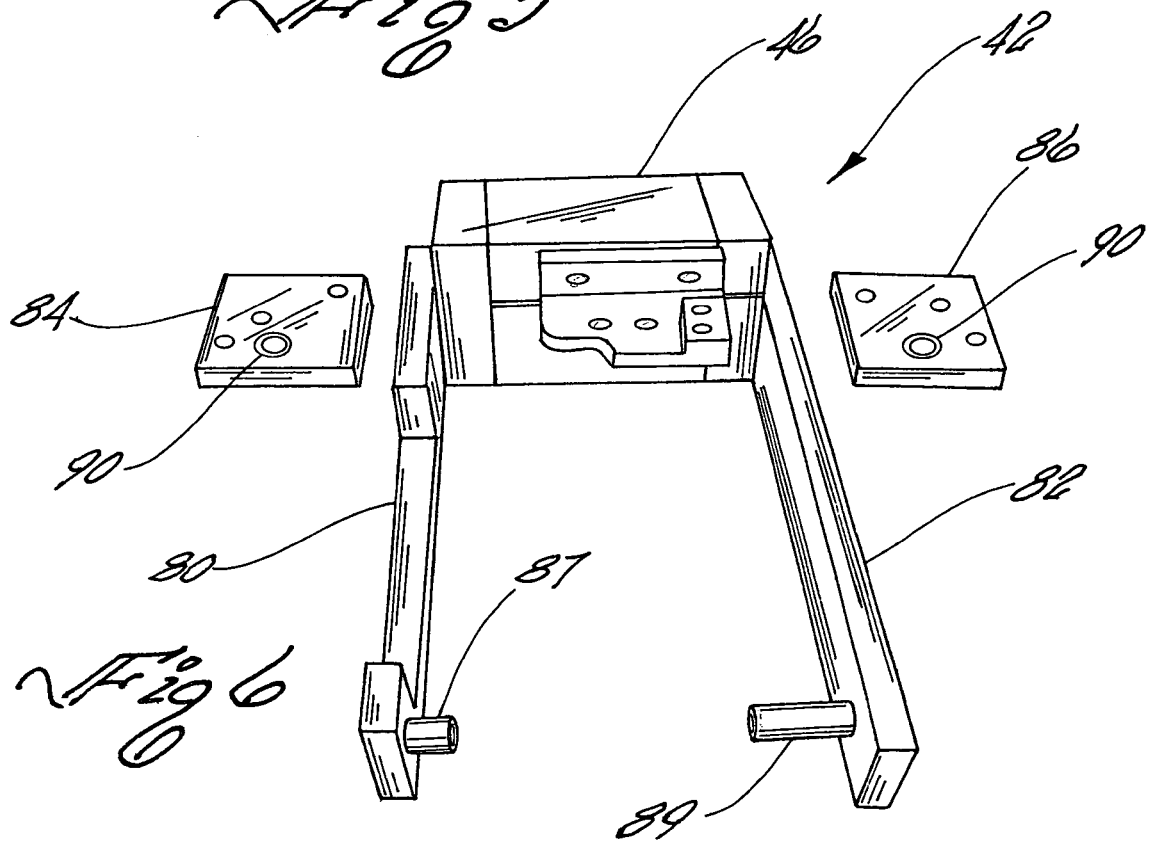
FIG. 6 illustrates the bushing repair apparatus completely assembled.

As shown in FIG. 6, the when the bushing repair fixture 42 is fully assembled one of the locating plates 80 and 82 is attached to each side of the central body 46 extending forward from the central body 46 of bushing repair fixture 42. This is the configuration of the bushing repair fixture 42 when fixture 42 is used for drilling the mounting pin holes 88 in bushings 74 and 76. Each of the small drill plates 84 and 86 includes a mounting pin hole/opening 90 used for drilling out a 6.1 mm mounting pin hole 88 in each replacement bushing 74 and 76.

The stainless steel alignment pins 50 and 51 align a 6.1 mm mounting pin hole 90 within each drill plate 84 and 86 with the 6.1 mm mounting pin hole 88 to be drilled in each replacement bushing 74 and 76. Each drill plate 84 and 86 has pair of alignment holes 93 which are adapted to receive the alignment pins 50 and 51 located on each side of the central body 46 of bushing repair fixture 42.

Figure 13:
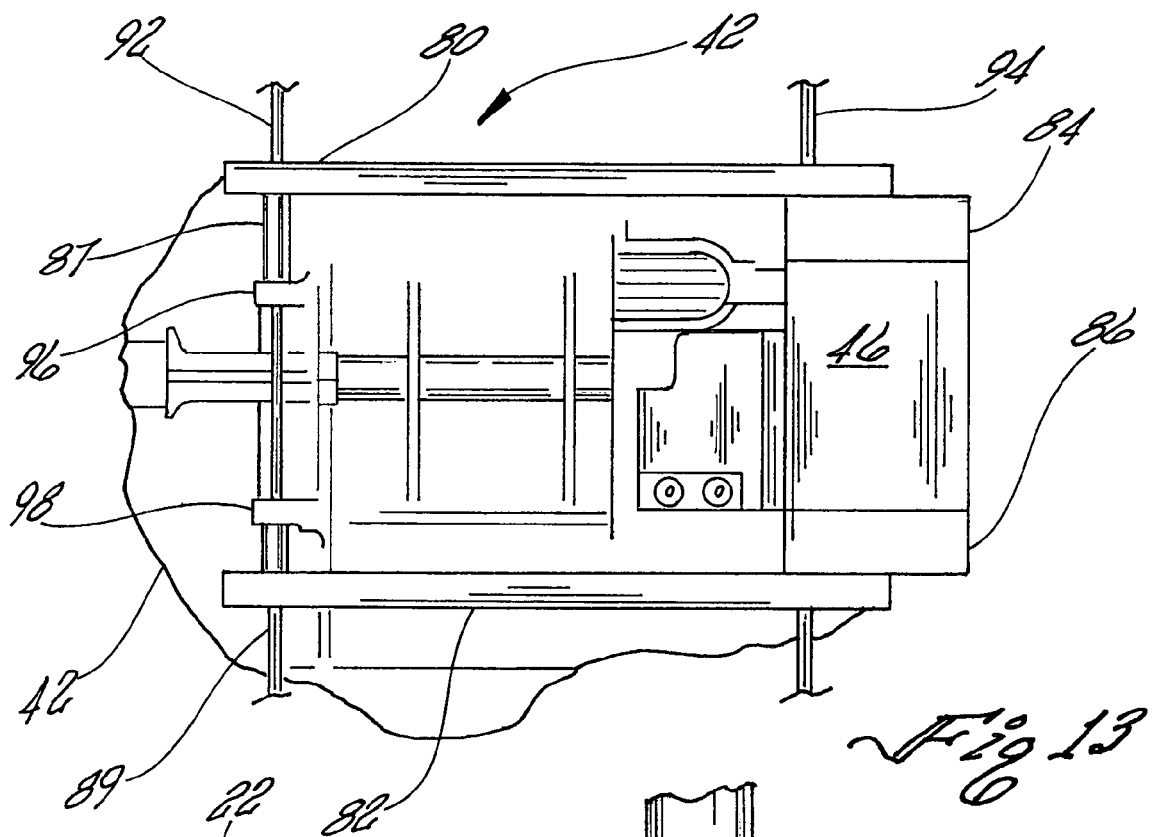
FIG. 13 illustrate the locating plates for the bushing repair apparatus of FIG. 4 when attached to the forward housing of the ammo feeder.

Referring to FIGS. 6 and 12–17, the user re-installs/ attaches the central body 46 of bushing repair fixture 42 to the forward housing 22 using drill plates 84 and 86 as shown in FIG. 13. The screws 100 for each drill plate 84 and 86 are lightly tightened so that minor movement of the central body 46 of bushing repair fixture 42 is possible.

The user next installs to the two locating plates 80 and 82 to the central body 46 of bushing repair fixture 42. The user can use either a pair of 6.1 mm drill bits 92 and 94 (as shown in FIG. 13) or a pair of mounting pins 28 (as shown in FIG. 1) to fasten the locating plates 80 and 82 to the central body 46 and a pair of mounting pin holes within arms 96 and 98 of forward housing 22 on the opposite side of the feeder. Drill bit 92 passes through an opening within bushing 87 of locating plate 80, the mounting pin holes within arms 96 and 98 and an opening within bushing 89 of locating plate 82. Opening 102 in locating plate 80 and opening 104 in locating plate 82 receive drill bit 94 which secures the locating plates 80 and 82 to central body 46 of bushing repair fixture 42.

After the locating plates 80 and 82 are attached to the central body 46, the user sets the 9 inch nominal distance between mounting pin holes within arms 96 and 98 and the holes 88 to be drilled in each replacement bushing 74 and 76. The user tightens all screws securing the central body 46 of bushing repair fixture 42 to the forward housing 22 and removes the locating plates 80 and 82.

Figure 14:
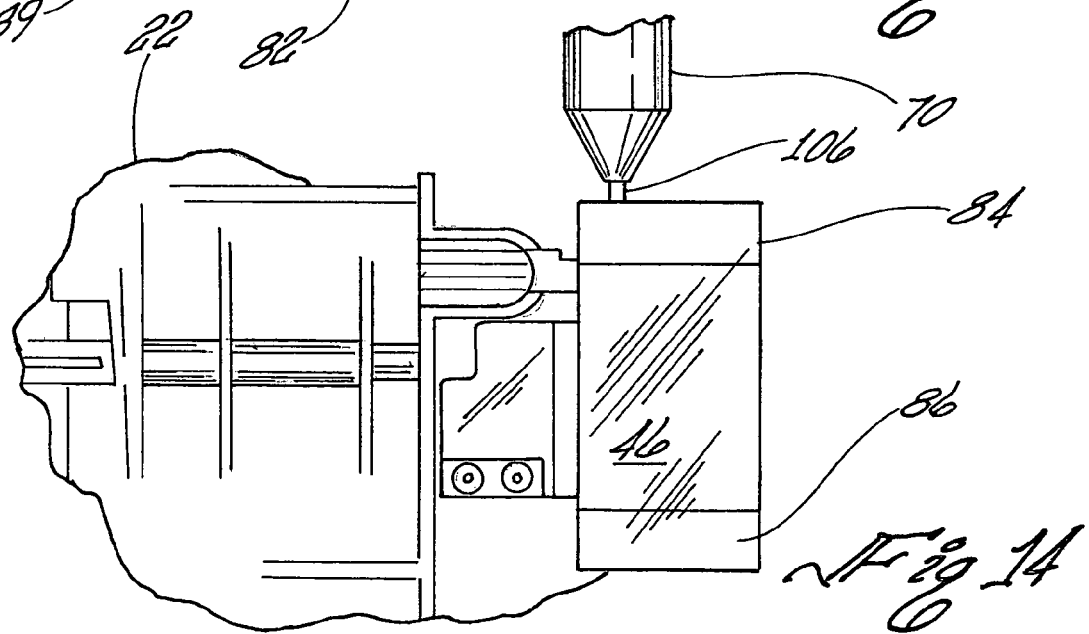

Referring to FIGS. 14, 15 and 16, the user first drills a 6.1 mm mounting pin hole through replacement bushing 74 (FIGS. 14 and 16) and replacement bushing 76 (FIGS. 15 and 16) using a 6.1 mm drill bit 106 and drill 70. The user then verifies the positioning of the mounting pin holes 88 in bushings 74 and 76 by attaching the feeder housing to the machine gun.

From the forgoing, it may readily be seen that the present invention comprises a new unique and exceedingly useful a bushing repair apparatus for use in repairing a machine gun feeder housing which constitutes a considerable improvement over the known prior art. Many modifications and variations of the present invention are possible in light of the above teachings. It is therefore to be understood that within the scope of the appended claims that the invention may be practice otherwise than as specifically described.

What is claimed is:

1. A bushing repair apparatus for repairing a pair of non-conforming bushings positioned within a pair of aligned arms located at one end of a ammo feeder forward housing for a machine gun, said bushing repair apparatus comprising:
    (a) a central assembly consisting of a central body and a mating plate affixed to said central body, said central body having a pair of alignment pins located on opposite sides of said central body, said mating plate being affixed to one arm of the pair of aligned arms of said forward housing;
    (b) a first pair of drill plates affixed to the opposite sides of said central body, each of said first pair of drill plates having a drill bushing hole, said pair of alignment pins on the opposite sides of said central body allowing for an alignment of the drill bushing hole in each of said first pair drill plates with one of said pair of non-confirming bushings, the drill bushing hole in each of said first pair of drill plates allowing a user of said bushing repair apparatus to position a first drill bit therein and remove said non-conforming bushings by drilling out with said first drill bit said nonconforming bushings from the pair of aligned arms of said forward housing; and
    (c) a second pair of drill plates affixed to the opposite sides of said central body after said user press fits replacement bushings into bushing holes created by a removal of said non-conforming bushings from the pair of aligned arms of said forward housing, each of said second pair of drill plates having a mounting pin opening, said pair of alignment pins on the opposite sides of said central body allowing for an alignment of the mounting pin opening in each of said second pair drill plates with one of said replacement bushings, the mounting pin opening in each of said second pair of drill plates allowing the user of said bushing repair apparatus to position a second drill bit therein and drill a mounting pin hole through each of said replacement bushings utilizing said second drill bit.

2. The bushing repair apparatus of claim 1 wherein said drill bushing hole in each of said first pair of drill plates comprises a 0.4688 inch drill bushing hole.

3. The bushing repair apparatus of claim 1 wherein said mounting pin opening in each of said second pair of drill plates comprises a 6.1 mm mounting pin opening.

4. The bushing repair apparatus of claim 1 wherein said mating plate is affixed to said central body by a first pair of cap screws.

5. The bushing repair apparatus of claim 4 wherein said mating plate is affixed to one arm of the pair of aligned arms of said forward housing by a second pair of cap screws.

6. The bushing repair apparatus of claim 1 wherein said user of bushing repair apparatus uses a scribe tool to scribe a circle on an outer surface of each of said pair of aligned arms, said circle being scribed around the circumference of said drill bushing hole in each of said first drill plates, said circle indicating where a drilled hole is to be located to remove said pair of non-conforming bushings.

7. A bushing repair apparatus for repairing a pair of non-conforming bushings positioned within a first pair of aligned arms located at one end of a ammo feeder forward housing for a machine gun, said forward housing having a second pair of aligned arms located at an opposite end thereof, said bushing repair apparatus comprising:
    (a) a central assembly consisting of a central body and a mating plate affixed to said central body, said central body having a pair of alignment pins located on opposite sides of said central body, said mating plate being affixed to one arm of the first pair of arms of said forward housing;
    (b) a first pair of drill plates affixed to the opposite sides of said central body, each of said first pair of drill plates having a drill bushing hole, said pair of alignment pins on the opposite sides of said central body allowing for an alignment of the drill bushing hole in each of said first pair drill plates with one of said pair of non-confirming bushings, the drill bushing hole in each of said first pair of drill plates allowing a user of said bushing repair apparatus to position a first drill bit therein and remove said non-conforming bushings by drilling out with said first drill bit said nonconforming bushings from the first pair of arms of said forward housing;
    (c) first and second locating plates coupled to said forward housing, said first and second locating plates having a bushing attached to an inner surface at one end, and an opening at an opposite end, the bushing of said first and second locating plates being aligned with the second pair of aligned arms of said forward housing, and the openings of said first and second locating plates being aligned with the first pair of aligned arms of said forward housing which allows the user to set a nine inch nominal distance between mounting pin apertures in said second pair of aligned arms and a mounting pin hole to be drilled through first and second replacement bushings to be mounted within said first pair of aligned arms; and
    (d) a second pair of drill plates affixed to the opposite sides of said central body after said user press fits said first and second replacement bushings into bushing holes created by a removal of said non-conforming bushings from said first pair of aligned arms, each of said second pair of drill plates having a mounting pin opening, said pair of alignment pins on the opposite sides of said central body allowing for an alignment of the mounting pin opening in each of said second pair drill plates with one of said first and second replacement bushings, the mounting pin opening in each of said second pair of drill plates allowing the user of said bushing repair apparatus to position a second drill bit therein and drill said mounting pin hole through each of said first and second replacement bushings utilizing said second drill bit.

8. The bushing repair apparatus of claim 7 wherein said drill bushing hole in each of said first pair of drill plates comprises a 0.4688 inch drill bushing hole.

9. The bushing repair apparatus of claim 7 wherein said mounting pin opening in each of said second pair of drill plate comprises a 6.1 mm mounting pin opening.

10. The bushing repair apparatus of claim 7 wherein said mating plate is affixed to said central body by a first pair of cap screws.

11. The bushing repair apparatus of claim 10 wherein said mating plate is affixed to one arm of the first pair of aligned arms of said forward housing by a second pair of cap screws.

12. The bushing repair apparatus of claim 7 wherein said user of bushing repair apparatus uses a scribe tool to scribe a circle on an outer surface of each of said pair of aligned arms, said circle being scribed around the circumference of said drill bushing hole in each of said first drill plates, said circle indicating where a drilled hole is to be located to remove said pair of non-conforming bushings.

13. The bushing repair apparatus of claim 7 wherein said user removes said sets said nine inch nominal distance between said mounting pin apertures in said second pair of aligned arms and said mounting pin hole to be drilled through said first and second replacement bushings to be mounted within said first pair of aligned arms.

14. A bushing repair apparatus for repairing a pair of non-conforming bushings positioned within a first pair of aligned arms located at one end of a ammo feeder forward housing for a machine gun, said forward housing having a second pair of aligned arms located at an opposite end thereof, said bushing repair apparatus comprising:
  (a) a central assembly consisting of a central body and a mating plate affixed to said central body, said central body having a pair of alignment pins located on opposite sides of said central body, said mating plate being affixed to one arm of the first pair of arms of said forward housing;
  (b) a first pair of drill plates affixed to the opposite sides of said central body, each of said first pair of drill plates having a drill bushing hole, said pair of alignment pins on the opposite sides of said central body allowing for an alignment of the drill bushing hole in each of said first pair drill plates with one of said pair of non-confirming bushings, the drill bushing hole in each of said first pair of drill plates allowing a user of said bushing repair apparatus to position a 0.4688 inch drill bit therein and remove said non-conforming bushings by drilling out with said 0.4688 inch drill bit said nonconforming bushings from the first pair of arms of said forward housing;
  (c) first and second locating plates coupled to said forward housing, said first and second locating plates having a bushing attached to an inner surface at one end, and an opening at an opposite end, the bushing of said first and second locating plates being aligned with the second pair of aligned arms of said forward housing, and the openings of said first and second locating plates being aligned with the first pair of aligned arms of said forward housing which allows the user to set a nine inch nominal distance between mounting pin apertures in said second pair of aligned arms and a 6.1 mm mounting pin hole to be drilled through first and second replacement bushings to be mounted within said first pair of aligned arms; and
  (d) a second pair of drill plates affixed to the opposite sides of said central body after said user press fits said first and second replacement bushings into bushing holes created by a removal of said non-conforming bushings from said first pair of aligned arms, each of said second pair of drill plates having a mounting pin opening, said pair of alignment pins on the opposite sides of said central body allowing for an alignment of the mounting pin opening in each of said second pair drill plates with one of said first and second replacement bushings, the mounting pin opening in each of said second pair of drill plates allowing the user of said bushing repair apparatus to position a 6.1 mm drill bit therein and drill said 6.1 mm mounting pin hole through each of said first and second replacement bushings utilizing said 6.1 mm drill bit.

15. The bushing repair apparatus of claim 14 wherein said drill bushing hole in each of said first pair of drill plates comprises a 0.4688 inch drill bushing hole.

16. The bushing repair apparatus of claim 14 wherein said mounting pin opening in each of said second pair of drill plate comprises a 6.1 mm mounting pin opening.

17. The bushing repair apparatus of claim 14 wherein said mating plate is affixed to said central body by a first pair of cap screws.

18. The bushing repair apparatus of claim 17 wherein said mating plate is affixed to one arm of the first pair of aligned arms of said forward housing by a second pair of cap screws.

19. The bushing repair apparatus of claim 14 wherein said user of bushing repair apparatus uses a scribe tool to scribe a circle on an outer surface of each of said pair of aligned arms, said circle being scribed around the circumference of said drill bushing hole in each of said first drill plates, said circle indicating where a drilled hole is to be located to remove said pair of non-conforming bushings.

20. The bushing repair apparatus of claim 14 wherein said user removes said sets said nine inch nominal distance between said mounting pin apertures in said second pair of aligned arms and said mounting pin hole to be drilled through said first and second replacement bushings to be mounted within said first pair of aligned arms.

\* \* \* \* \*